US012671704B2

(12) United States Patent (10) Patent No.: US 12,671,704 B2
Tivadar et al. (45) Date of Patent: Jun. 30, 2026

(54) TARGETED PREVENTION OF ONLINE FRAUD

(71) Applicant: Bitdefender IPR Management Ltd., Nicosia (CY)

(72) Inventors: Marius M. Tivadar, Baia Mare (RO); Alexandru P. Marinescu, Dumbravita (RO); Alexandra S. Bocereg, Timisoara (RO); Cristian I. Vijdea, Timisoara (RO)

(73) Assignee: Bitdefender IPR Management Ltd., Nicosia (CY)

( * ) Notice: Subject to any disclaimer, the term of this patent is extended or adjusted under 35 U.S.C. 154(b) by 226 days.

(21) Appl. No.: 18/786,453

(22) Filed: Jul. 27, 2024

(65) Prior Publication Data

US 2026/0032131 A1 Jan. 29, 2026

(51) Int. Cl.
*H04L 9/40* (2022.01)
*H04L 51/216* (2022.01)
*H04L 51/224* (2022.01)

(52) U.S. Cl.
CPC ........ *H04L 63/1416* (2013.01); *H04L 51/216* (2022.05); *H04L 51/224* (2022.05)

(58) Field of Classification Search
CPC ............... H04L 63/1416; H04L 51/216; H04L 63/1483; H04L 63/1441; G06F 21/554; G06N 3/08
USPC .......................................................... 726/22
See application file for complete search history.

(56) References Cited

U.S. PATENT DOCUMENTS

| 7,665,140 | B2 * | 2/2010 | Oliver | H04L 63/123 |
|---|---|---|---|---|
| | | | | 709/204 |
| 8,578,480 | B2 * | 11/2013 | Judge | H04L 63/1466 |
| | | | | 713/192 |
| 9,633,201 | B1 * | 4/2017 | Katz | G06Q 30/00 |
| 9,906,539 | B2 * | 2/2018 | Higbee | G06F 16/35 |

(Continued)

FOREIGN PATENT DOCUMENTS

EP 2924923 A1 * 9/2015 ............. H04L 51/18

OTHER PUBLICATIONS

Web Phishing Net (WPN) (Year: 2020).*

(Continued)

*Primary Examiner* — Sargon N Nano
(74) *Attorney, Agent, or Firm* — Law Office of Andrei D Popovici, PC

(57) ABSTRACT

Some embodiments implement a targeted notification of potential victims of online fraud, such as fishing, among others. A security server protects a plurality of client devices by using telemetry data harvested from each device to construct a device-specific client profile. The client profile indicates a typical manner in which the respective device is used (e.g., which applications are installed and how much each installed application is being used). Features extracted from incoming messages are used to identify fraudulent messages and divide an incoming message stream into clusters. In response to identifying a cluster including fraudulent messages, some embodiments identify the recipients of cluster messages, and select a notification target from among the protected client devices according to a similarity between a client profile of the notification target and client profiles of the message recipients. A security notification is sent to the notification target.

21 Claims, 11 Drawing Sheets

(56)                References Cited

U.S. PATENT DOCUMENTS

| | | | |
|---|---|---|---|
| 10,332,003 B1 | 6/2019 | Sites | |
| 10,433,035 B2 * | 10/2019 | Chayat | H04Q 9/00 |
| 11,082,444 B2 * | 8/2021 | Macleod | G06F 21/566 |
| 11,153,331 B2 * | 10/2021 | Zou | H04L 63/04 |
| 2005/0257261 A1 | 11/2005 | Shraim | |
| 2009/0177979 A1 | 7/2009 | Garbow | |
| 2011/0179492 A1 | 7/2011 | Markopoulou | |
| 2012/0071131 A1 | 3/2012 | Zisapel | |
| 2012/0222111 A1 * | 8/2012 | Oliver | H04L 63/123 |
| | | | 726/22 |
| 2013/0091573 A1 | 4/2013 | Herz | |
| 2015/0095146 A1 | 4/2015 | Adjaoute | |
| 2015/0156192 A1 | 6/2015 | Yang | |
| 2017/0244736 A1 * | 8/2017 | Benishti | H04L 63/1441 |
| 2017/0366571 A1 | 12/2017 | Boyer | |
| 2019/0095919 A1 | 3/2019 | Legault | |
| 2019/0173914 A1 | 6/2019 | Irimie | |
| 2019/0173917 A1 | 6/2019 | Sites | |
| 2019/0349386 A1 * | 11/2019 | Erciyes | G06F 3/0647 |
| 2020/0186545 A1 | 6/2020 | Dichiu | |
| 2022/0116420 A1 | 4/2022 | Weber | |
| 2023/0403298 A1 | 12/2023 | Silva | |

OTHER PUBLICATIONS

Context-based Clustering to Mitigate Phishing Attacks—Tarini Saka (Year: 2022).*
Using clustering Algorithms to automatically identify phishing campaigns (Althobaiti et al. Aug. 12, 2023) (Year: 2023).*
European Patent Office (EPO), International Search Report and Written Opinion mailed Oct. 13, 2025 for PCT International Application No. PCT/EP2025/071478, international filing date Jul. 25, 2025, priority date Jul. 27, 2024.

* cited by examiner

Client profile

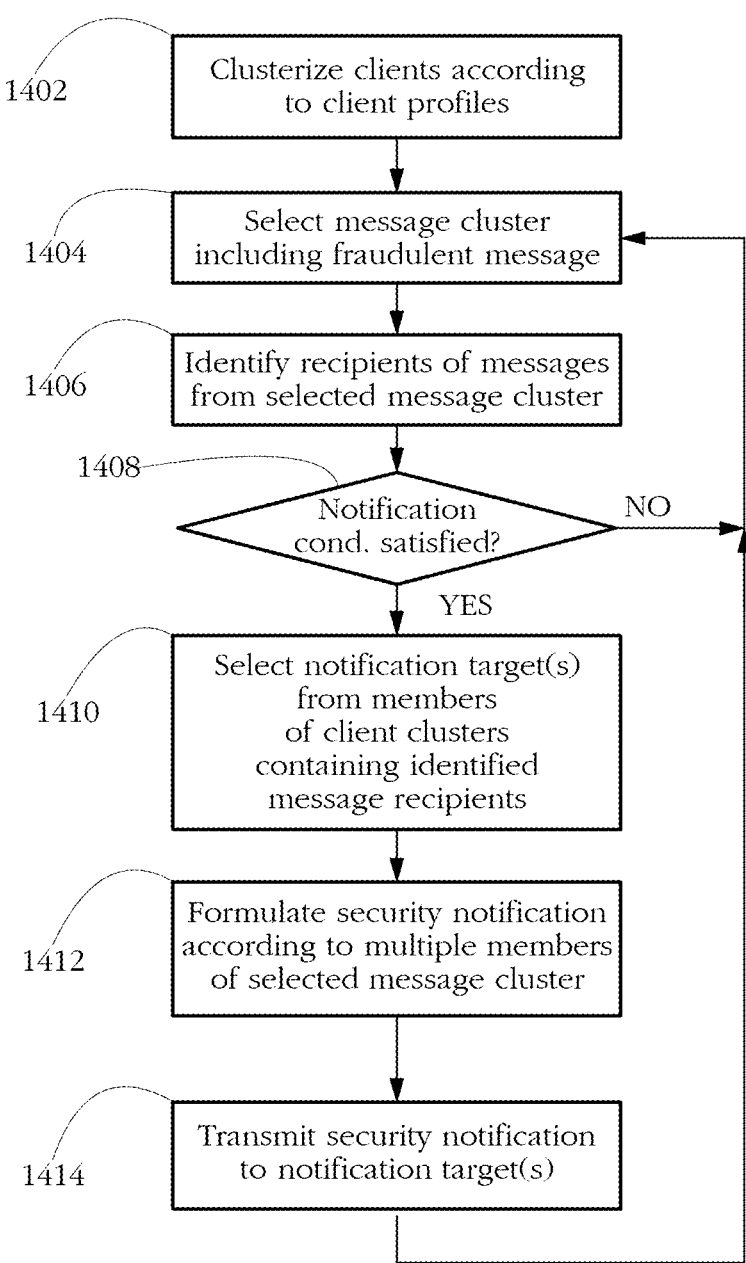

1402    Clusterize clients according to client profiles

1404    Select message cluster including fraudulent message

1406    Identify recipients of messages from selected message cluster

1408    Notification cond. satisfied?        NO

YES

1410    Select notification target(s) from members of client clusters containing identified message recipients 1412    Formulate security notification according to multiple members of selected message cluster 1414    Transmit security notification to notification target(s)

FIG. 14

TARGETED PREVENTION OF ONLINE FRAUD

BACKGROUND OF THE INVENTION

The invention relates to computer security, and in particular to combating online fraud such as phishing, among others.

Online fraud, especially in the form of phishing and identity theft, has been posing an increasing threat to Internet users worldwide. Sensitive identity information such as user names, IDs, passwords, social security and medical records, bank and credit card details obtained fraudulently by international criminal networks operating on the Internet are used to withdraw private funds and/or are further sold to third parties. Beside direct financial damage to individuals, online fraud also causes a range on unwanted side effects, such as increased security costs for companies, higher retail prices and banking fees, declining stock values, lower wages and decreased tax revenue.

Online fraud is facilitated by the explosive growth of mobile computing and online services, with millions of devices such as smartphones and tablet computers constantly connected to the Internet and acting as potential targets. In a typical example of phishing, a user receives a fraudulent communication masquerading as a legitimate message from a service provider such as a bank, phone company, online retailer, courier, etc. The message may report a fictitious problem with the user's account or recent order and invite the user to contact the respective service provider via a link included in the respective message. The link may lead to a fake interface (e.g., webpage) used by online criminals to steal sensitive data such as login credentials and credit card numbers, among others. Accessing such links may further expose the user to a risk of installing malicious software.

The content and format of fraudulent messages changes all the time, and the sheer volume of such messaging makes detection inherently difficult. The problem of detection is further aggravated by the recent development of sophisticated language models capable of highly realistic messaging. Meanwhile, current attempts at prevention, for instance by informing users on the dangers of online fraud, have been met with mixed reviews. Flooding users with warnings about current or potential threats typically does not have the desired effect, since it negatively impacts user experience. Warning messages increase the overall volume of messaging. Some users find such warnings intrusive or patronizing, while others simply ignore them. Therefore, there is an ongoing interest in developing robust and user-friendly methods of combating online fraud.

SUMMARY OF THE INVENTION

According to one aspect, a method of preventing online fraud comprises employing at least one hardware processor of a computer system to, in response to determining that a selected message received by a client device is fraudulent, select a group of messages from a message corpus according to a similarity between members of the group of messages and the selected message. The method further comprises, in response to selecting the group of messages, identifying a group of recipient devices comprising recipients of members of the selected group of messages, and determining whether a notification condition is satisfied according to a similarity between members of the identified group of recipient clients. The method further comprises in response to determining that the notification condition is satisfied, identifying a target device according to a similarity between a usage indicator of the target device and a usage indicator of a selected member of the group of recipient devices, and transmitting a security notification to the target device, informing a user of the target device of a likelihood of receiving a fraudulent message similar to the selected message. The usage indicator of the target device quantifies a usage of a selected computer program by the target device. The security notification is formulated according to a content of multiple members of the group of messages.

According to another aspect, a computer system comprises at least one hardware processor configured to, in response to determining that a selected message received by a client device is fraudulent, select a group of messages from a message corpus according to a similarity between members of the group of messages and the selected message. The at least one hardware processor is further configured to, in response to selecting the group of messages, identify a group of recipient devices comprising recipients of members of the selected group of messages, and determine whether a notification condition is satisfied according to a similarity between members of the identified group of recipient clients. The computer system is further configured to, in response to determining that the notification condition is satisfied, identify a target device according to a similarity between a usage indicator of the target device and a usage indicator of a selected member of the group of recipient devices, and to transmit a security notification to the target device, informing a user of the target device of a likelihood of receiving a fraudulent message similar to the selected message. The usage indicator of the target device quantifies a usage of a selected computer program by the target device. The security notification is formulated according to a content of multiple members of the group of messages.

According to another aspect, a non-transitory computer-readable medium stores instructions which, when executed by at least one hardware processor of a computer system, causes the computer system to, in response to determining that a selected message received by a client device is fraudulent, select a group of messages from a message corpus according to a similarity between members of the group of messages and the selected message. The instructions further cause the computer system to, in response to selecting the group of messages, identify a group of recipient devices comprising recipients of members of the selected group of messages, and determine whether a notification condition is satisfied according to a similarity between members of the identified group of recipient clients. The instructions further cause the computer system to, in response to determining that the notification condition is satisfied, identify a target device according to a similarity between a usage indicator of the target device and a usage indicator of a selected member of the group of recipient devices, and to transmit a security notification to the target device, informing a user of the target device of a likelihood of receiving a fraudulent message similar to the selected message. The usage indicator of the target device quantifies a usage of a selected computer program by the target device. The security notification is formulated according to a content of multiple members of the group of messages.

BRIEF DESCRIPTION OF DRAWINGS

The foregoing aspects and advantages of the present invention will become better understood upon reading the following detailed description and upon reference to the drawings where:

FIG. 14 shows yet another alternative exemplary sequence of steps performed by the security server according to some embodiments of the present invention.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. A database or knowledgebase herein denotes any organized, searchable collection of data. Computer-readable media encompass non-transitory media such as magnetic, optic, and semiconductor storage media (e.g., hard drives, optical disks, flash memory, DRAM), as well as communication links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

The following description illustrates embodiments of the invention by way of example and not necessarily by way of limitation.

Figure 1:
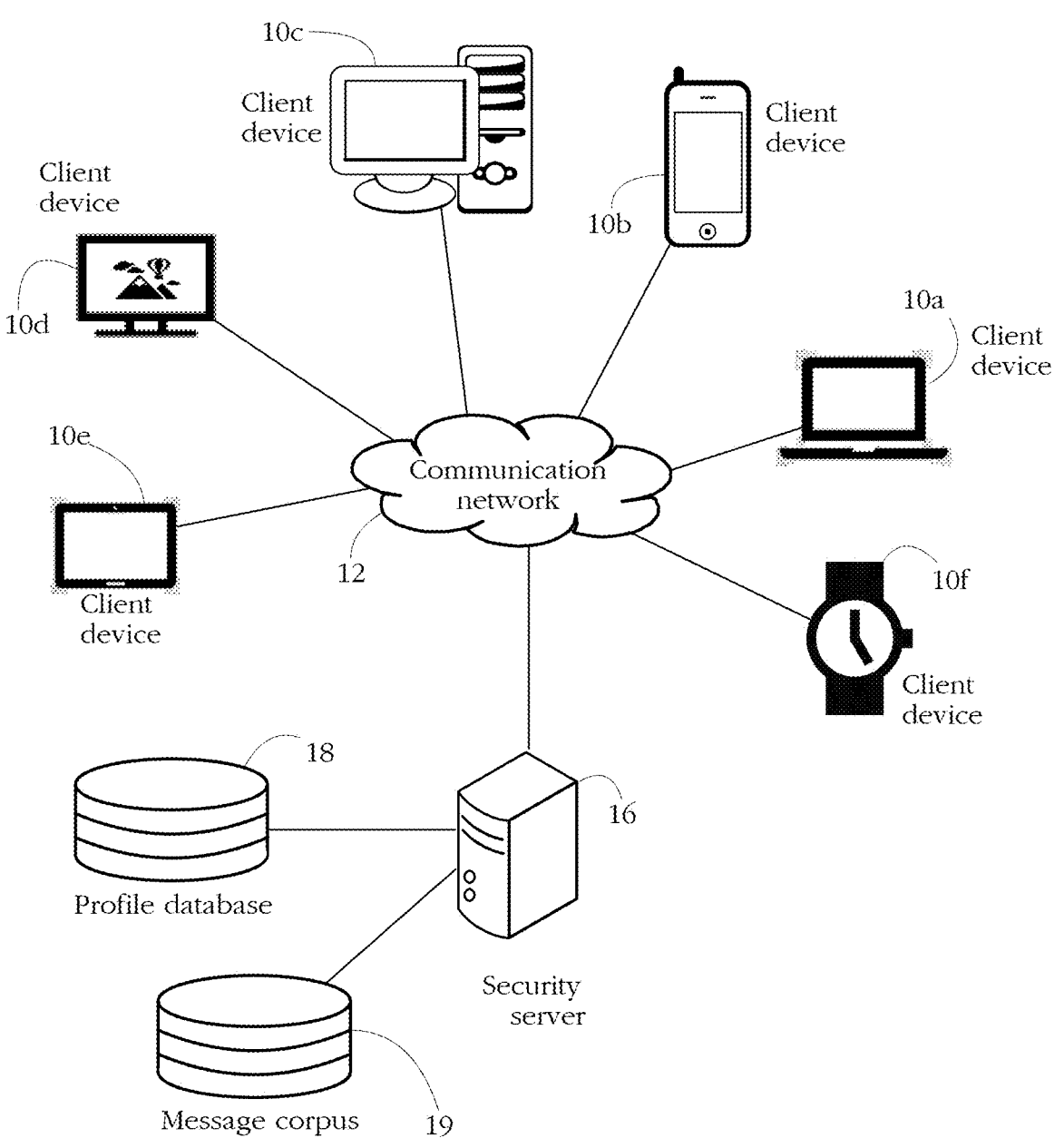
FIG. 1 shows an exemplary set of client devices protected against online fraud according to some embodiments of the present invention.

FIG. 1 shows a plurality of client devices 10a-f protected against online fraud according to some embodiments of the present invention. Exemplary client devices 10a-f include personal computer systems, mobile computing platforms (e.g., laptop computers, tablets, smartphones), entertainment devices (e.g., TVs, game consoles), wearable devices (e.g., smartwatches, fitness bands), household appliances (e.g., thermostats, refrigerators), and any other electronic device comprising a hardware processor, a memory, and a communication interface enabling the respective device to communicate with other devices/computer systems.

Exemplary client devices 10a-f are connected to a communication network 12, which may include a local area network (e.g., home network, corporate network, etc.), a wide-area network and/or the Internet. Network 12 generically represents a set of hardware (physical layer) and software interfaces enabling the transfer of data between devices 10a-f and other entities connected to network 12.

In some embodiments, client devices 10a-f collaborate with a security server 16 to protect users of devices 10a-f against online fraud. A single instance of server 16 may protect multiple client devices. Such protection may pe tailored to each device, device group, user, or user group, and various parameters of the respective protection service may be defined via a subscription/service agreement, etc. Server 16 herein generically represents a set of communicatively coupled computer systems, which may or may not be in physical proximity to each other.

Figure 2:
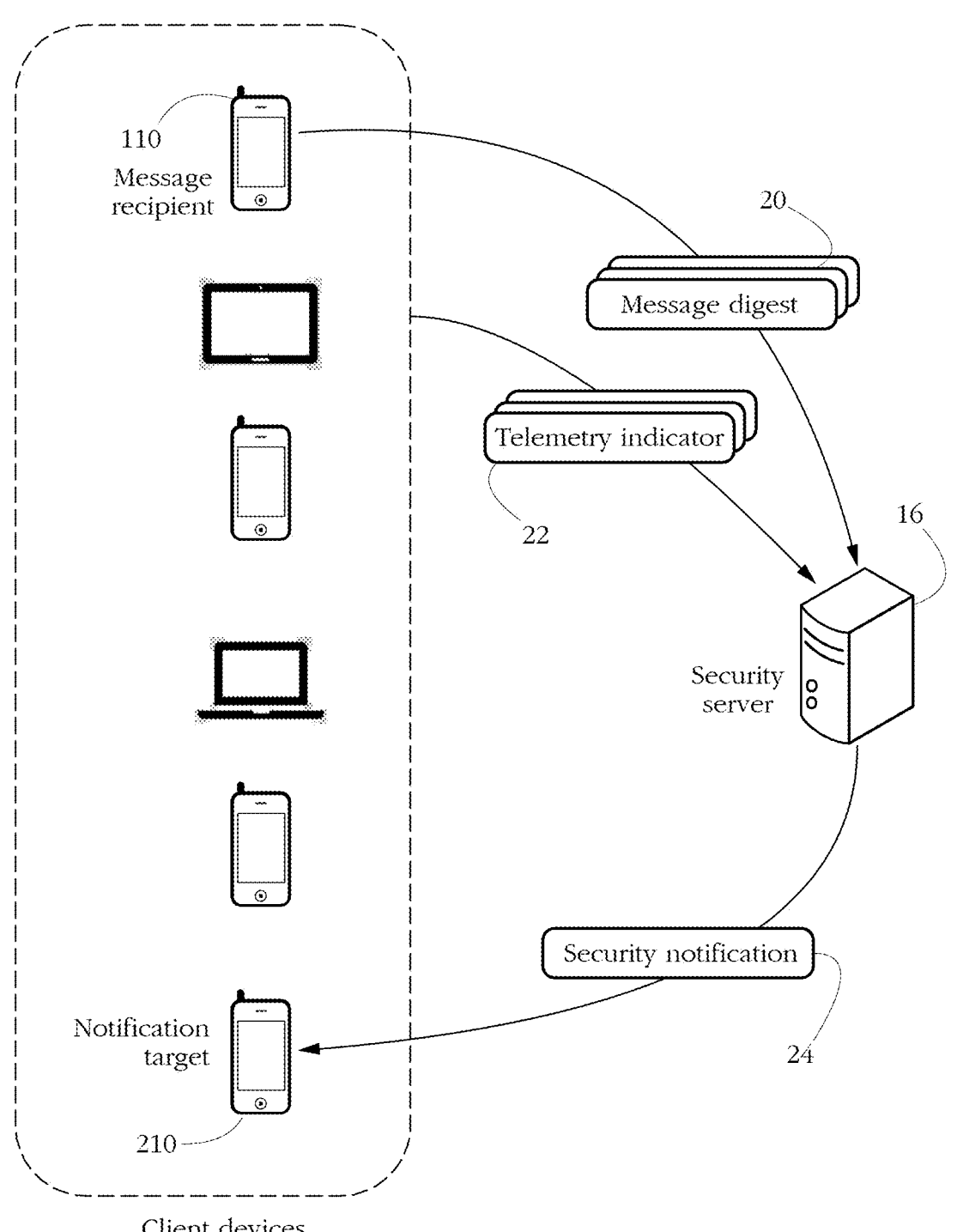
FIG. 2 illustrates an exemplary data exchange according to some embodiments of the present invention.

In some embodiments, security server 14 collects various data from individual client devices, as illustrated in FIG. 2. Such data may include telemetry indicators 22 characterizing each protected client device 10a-f and/or its user. Exemplary telemetry indicators 22 indicate a typical and/or average manner in which the respective device is being used (e.g., which software applications are used and when, what kinds of remote resources/URLs are typically accessed, etc.). Other telemetry indicators 22 may indicate hardware and/or software characteristics of the respective device, such as make and model, version of an operating system, etc. Telemetry indicators are described in further detail below.

Server 16 may further collect data characterizing electronic communications (messages) received by client devices. Such messages herein encompass peer-to-peer messages as well as messages exchanged via public chatrooms, forums, social media sites, etc. Examples include short message service (SMS) messages, e-mail messages, and communications exchanged via instant messaging applications such as WhatsApp Messenger®, Telegram®, WeChat®, and Facebook® Messenger®, among others. Other exemplary electronic communications/messages herein include a content of a Facebook® wall, a chat conducted on an online forum such as Reddit® and Discord®, and a comment to a blog post.

Messages may vary in format according to the respective messaging platform, protocol, and/or application, but in general they comprise an encoding of a text and/or an encoding of a media file (e.g., image, movie, sound, etc.). The text part may comprise text written in a natural language, as well as other alphanumeric and/or special characters such as emoticons, among others. An encoding of the respective message may further include various metadata such as identifiers of a sender and receiver of the respective message and a timestamp indicative of a time of transmission of the respective message.

For clarity, the present description will focus on the analysis of text messages. However, a skilled artisan will know that this aspect is not meant to be limiting. The described systems and methods may be adapted to processing audio messages (spoken conversations), video messages, or any combination of carrier media. In some such embodiments, a dedicated conversion module executing on a client and/or security server 16 may convert the respective type of communication into text before applying some of the methods described herein. Other embodiments may directly parse various types of messages (e.g., audio, video, etc.) for feature extraction and clustering as described below.

In some embodiments as illustrated in FIG. 2, message-characteristic data is encoded as a message digest 20 and transmitted from a message recipient 110 to security server 16. Message recipient 110 may represent any of client systems 10a-e in FIG. 1. Alternatively, message digest 20 may be generated at, and transmitted by, a third party such as an email server, instant messaging server, or a gateway device routing electronic communications to and from message recipient 110.

In some embodiments, to protect the privacy of the respective message recipient, message digest 20 only includes a set of feature values characterizing a respective message, each feature value comprising a value of a distinct message feature. Some exemplary message features are described in more detail below. In alternative embodiments, message digest 20 may include at least a part of the respective message itself. The respective message content may be encrypted to ensure privacy. In some embodiments, encryption may be performed according to a homomorphic encryption procedure, which allows feature extraction directly from the encrypted message (without a preliminary decryption), thus ensuring that security server 16 is oblivious to the content of the respective communications. Such embodiments may use any convenient homomorphic encryption procedure known in the art.

In some embodiments, in response to receiving message digest 20 characterizing a message received by message recipient 110, some embodiments of server 16 determine whether digest 20 is indicative of a computer security threat (such as online fraud, among others). If yes, some embodiments identify a notification target 210 comprising another client system having a client profile similar to message recipient 110 according to telemetry data 22, and notify target 210 of the respective threat via a security notification 24, as described in detail below.

Figure 3:
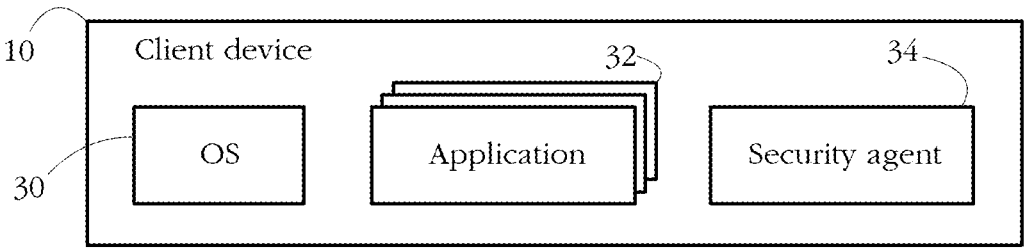
FIG. 3 shows exemplary components of a client device according to some embodiments of the present invention.

FIG. 3 shows exemplary components of a client device 10, which generically represents any of client devices 10a-e in FIG. 1 according to some embodiments of the present invention. At least some of the illustrated components may be implemented as computer programs (software) executing on a hardware processor of device 10. An operating system 30 forms an interface between application software and the hardware (e.g., processor, I/O devices, etc.) of the respective client. Popular examples of OS 30 include a version of Microsoft Windows®, iOS®, and Android®, among others.

Applications 32 generically represent any software installed on client device 10, such as productivity applications, utilities, games, browser, social media, and electronic communication applications (e.g., software implementing an SMS service on a mobile phone, an email client, an instant messaging application such as WhatsApp Messenger®, etc.), among others. A security agent 34, which may also be embodied as a set of interconnected computer programs, is configured to protect client device 10 against online fraud. Agent 34 may form a part of a larger software suite protecting device 10 against other computer security threats such as malware, unsolicited communications, etc., and/or enabling confidential communications with other parties (e.g., via virtual private networking—VPN).

Figure 4:
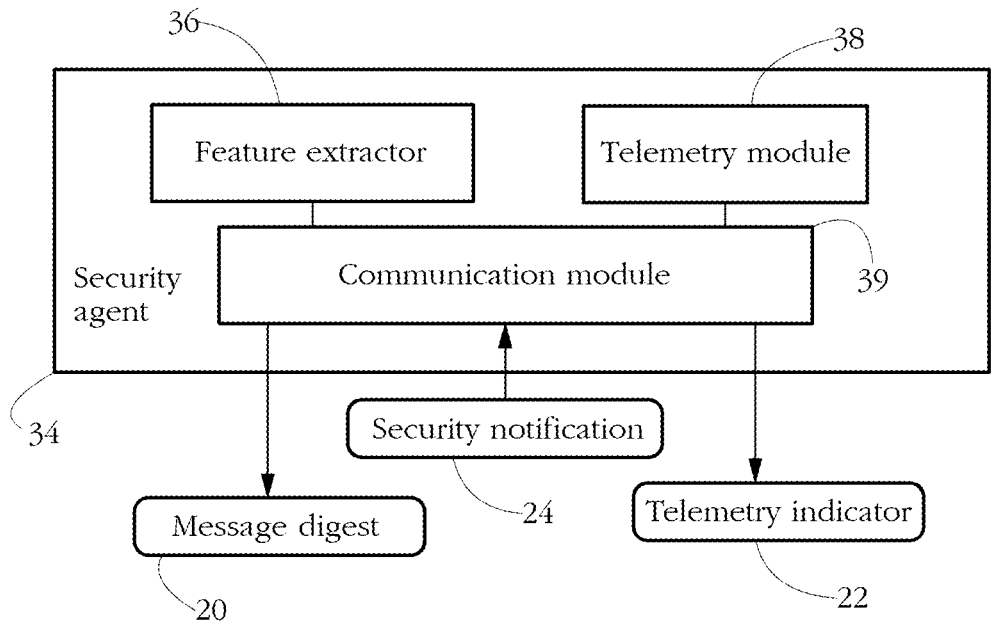
FIG. 4 shows exemplary components of a security agent according to some embodiments of the present invention.

FIG. 4 shows exemplary components of security agent 34 according to some embodiments of the present invention. Agent 34 comprises a feature extractor 36, a telemetry module 38, and a communication module 39 communicatively coupled to feature extractor 36 and telemetry module 38.

Figure 5:
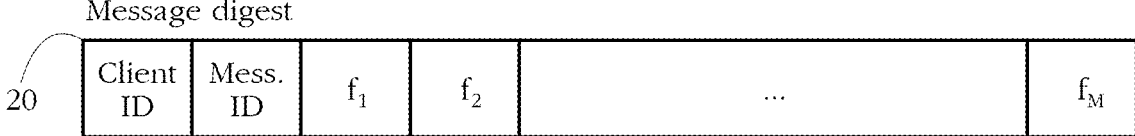
FIG. 5 shows an exemplary message digest comprising a plurality of message feature values according to some embodiments of the present invention.

In some embodiments, feature extractor 36 is configured to determine a set of feature values characterizing a message received by client device 10, and further construct message digest 20 according to the determined feature values. FIG. 5 shows an exemplary message digest 20 according to some embodiments. A skilled artisan will know that the illustrated data structure is only exemplary and not meant to be limiting. Digest 20 comprises an identifier of a message and/or an identifier of a client device having received the respective message. Unique identifiers may be generated using any method known in the art, e.g., by hashing. Digest 20 further includes a plurality of feature values $f_i$, each such feature value comprising a value of a selected feature (attribute) $F_i$ of the respective message. The count of such attributes $F_i$ may vary among embodiments, but typically it is of the order of several tens to several thousands. Some attributes may be fraud-indicative, either intrinsically or in combination with other features. Values $f_i$ may be numbers, Booleans, character strings, or of any other data type according to the type of the respective feature $F_i$.

Some message features $F_i$ may characterize the content of a message (e.g., text part). One such exemplary content feature comprises at least a part of the message text. Other examples of content features include indicators of whether the respective message contains a pre-determined keyword/phrase (e.g., login, bank, package, phone bill, specific company names, specific brand names), whether the respective message includes a hyperlink, whether the respective message includes an ID (e.g., personal name, email address, social media handle, login credentials), etc. Other content features may comprise a size of the text (e.g., count of characters) and an indicator of a visual layout of the message.

Some advanced embodiments may use a language model to extract content features. A language model herein denotes any implementation of a computational model of a natural language such as English or Chinese, among others. Exemplary language models include probabilistic n-gram models, language models implemented using recurrent neural networks, and large language models (LLMs) implemented using generative pre-trained transformers (GPT), among others. Some language models are herein deemed 'generative' in the sense that they are configured to input a sequence of words (e.g., a sentence or a question) and in response, automatically generate another sequence of words (e.g., a plausible continuation or a reply) according to the input word sequence. Examples include any instance of a pre-trained, off-the-shelf LLM such as GPT-3 from OpenAI, LLAMA from Meta AI, and Mistral from Mistral AI, among others. The structural details of such language models go beyond the scope of the present invention and they may be implemented using any method known in the art of artificial intelligence.

Figure 6:
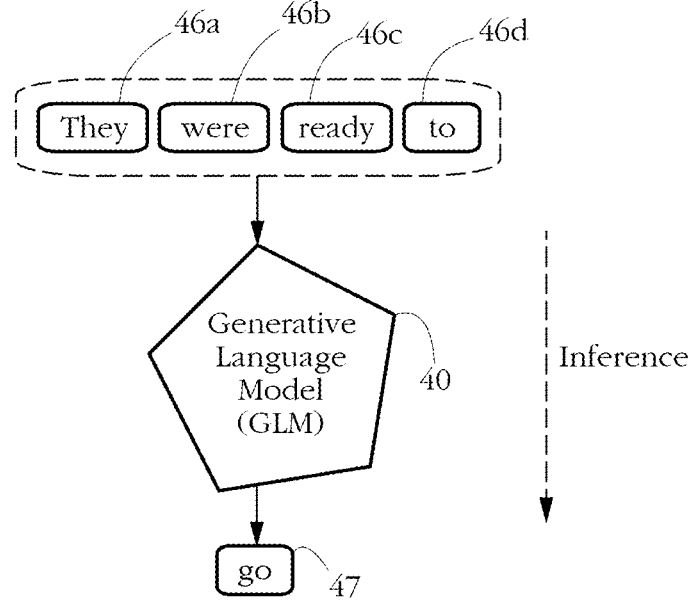
FIG. 6 illustrates the operation of an exemplary generative language model (GLM) according to some embodiments of the present invention.

An exemplary generative language model (GLM) 40 according to some embodiments of the present invention is illustrated in FIG. 6. GLM 40 is configured to receive a language model prompt comprising a sequence of tokens 46a-d, and in response, output a predicted token 47 determined according to the received LM prompt, predicted token 47 comprising a likely continuation of the sequence of tokens 46a-d. The set of calculations carried out by GLM 40 to produce an individual predicted token are herein collectively called an inference. When the architecture of GLM 40 is based on neural networks, such calculations may comprise matrix multiplications and evaluating a set of activation functions, among others.

Exemplary tokens 46a-d and 47 may comprise individual words, but also numbers, punctuation marks, special characters, abbreviations, initialisms (e.g., LOL, ROFL), emojis, as well as network addresses, universal record identifiers (URI) and locators (URL), among others. Some tokens may include multiple words such as phrases, etc. Some GLMs 40 can also ingest content other than natural language text, such as fragments of computer code. For instance, individual tokens 46a-d and 47 may include computer instructions, variable names and values, mathematical symbols, etc.

Figure 7:
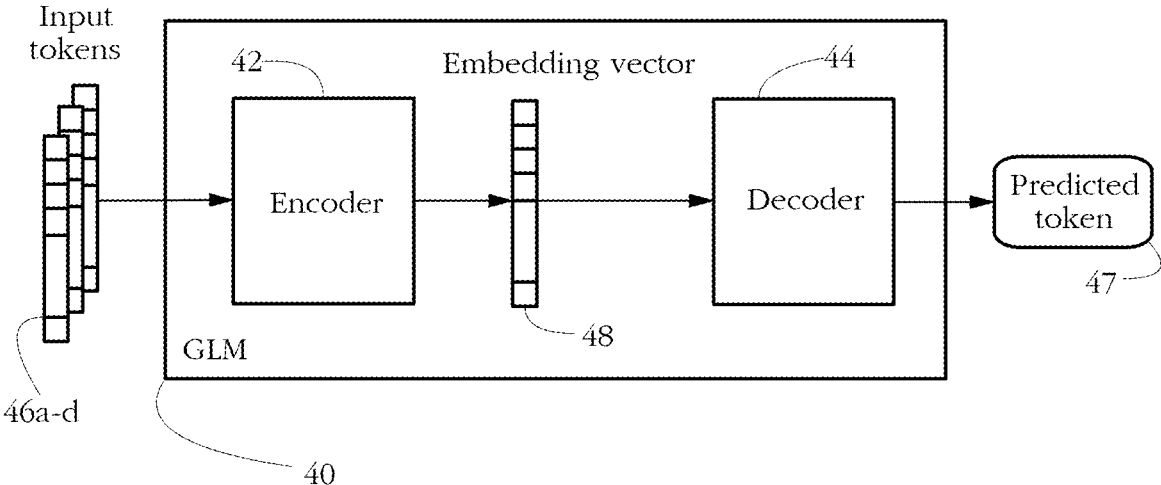
FIG. 7 illustrates exemplary components of a GLM according to some embodiments of the present invention.

FIG. 7 further shows a structural diagram of GLM 40 according to some embodiments of the present invention. GLM 40 comprises a stack of interconnected neural layers, each layer receiving input from the previous layer and feeding the next layer of the stack. Functionally, the layer stack may be broken down into a first subset of layers collectively forming an encoder 42, and a second subset of layers collectively forming a decoder 44. Encoder 42 thus receives a numerical representation of input tokens 46a-d and outputs an embedding vector 48 comprising a plurality of numbers determined according to the input token sequence and amounting to an internal representation of the respective sequence of tokens. Decoder 44 then determines predicted token 47 according to the received embedding vector 48.

Some embodiments of the present invention determine at least some message feature values $f_i$ according to elements of embedding vector 48, relying on the observation that LM encoder 42 typically constructs a semantic space, wherein embedding vectors 48 corresponding to two fragments of text having a similar meaning are relatively close together. Therefore, determining message feature values $f_i$ according to the embedding vector may enable identifying semantically-similar messages, such as messages related to parcel delivery, or messages related to banking, etc., even in cases where such messages differ substantially in phrasing. In one such exemplary embodiment, feature extractor 36 transmits an input token sequence comprising at least a part of a message to GLM 40, which in turn may determine a set of corresponding embedding vector(s). Feature extractor 36 may then compute a set of feature values $f_i$ according to elements of embedding vector(s) 48. GLM 40 may execute locally (on the same device that executes feature extractor 36) or remotely, on a dedicated server computer. Remote GLMs may be accessed for instance using dedicated application programming interfaces (API).

Additionally or alternatively, some embodiments use GLM 40 to evaluate other message features, relying on the observation that language models are increasingly capable of sophisticated calculations and are trained on vast text corpora that encode substantial amounts of collective knowledge. Exemplary message features $F_i$ that can be evaluated using LMs include, among others, an indicator of a sentiment (e.g., politeness, anger, joy, sadness, etc.) of a respective message, an indicator of a category/class that the respective message is a member of (e.g., parcel delivery notifications, product offers, personal messages, client support messages, invitations, etc.), and an indicator of a computer security risk associated with the respective message (e.g., safe, probably fraudulent, unknown, etc.). Other exemplary message features extracted via a helper LM include an indicator of whether the respective message includes a company name and/or a brand name, and an indicator of a natural language that the respective message is formulated in (e.g., English, Swedish). To extract such message features, some embodiments of feature extractor 36 may formulate an LM prompt including the target text selected from the respective message, and further including explicit instructions for the respective LM. Some examples of LM prompt include: "What is the sentiment of the following message: [message excerpt]?", "Is the following message online fraud? [message excerpt]", "Does the following message include a company name? If yes, which company? [message excerpt]", "What is the recipient of the following message instructed to do? [message excerpt]", "What language is the following message in? [message excerpt]", "Extract 5 keywords characterizing the following message [message excerpt]", "Summarize the following message [message excerpt]", etc. An artisan will know that these are only examples and not meant to be limiting.

Yet other exemplary message feature values $f_i$ that may be included in message digest 20 characterize metadata attached to the respective message, such as an identifier (e.g., name, alias, username, handle, email address, network address, phone number) of a sender of the respective message, a country code of the receiving client, a time stamp, and a type of media attached to or embedded into the respective message, among others.

To determine message feature values $f_i$, embodiments of the present invention may use various methods of accessing the respective messages. With the agreement of a user of client device 24, some embodiments install a data grabber module (for instance, a plugin or add-on) within a local messaging application. Such addition may even be performed without the knowledge of the user, for instance by hooking a component of the respective messaging application, thus redirecting execution to the data grabber module. The data grabber may then notify security agent 34 when the messaging application executes some specific operation such as receiving a communication or receiving user input, enabling the extraction of message data. Yet other exemplary embodiments extract message content using built-in features of OS 30, such as an accessibility application programming interface (API). Accessibility APIs comprise software typically configured to grab information currently displayed on an output device (e.g., screen) of client device 10 for the purpose of making such information accessible to people with disabilities. One exemplary application of such accessibility APIs comprises translating on-screen text into audio (spoken text) to enable visually impaired people to use the computer. Some embodiments of security agent 34 may be configured to call specific accessibility API functions to parse data structures such as user interface (UI) trees while device 10 is displaying content generated by the messaging application, thus extracting message data and/or metadata.

Another category of methods for accessing message content comprise directly intercepting network traffic going into the respective messaging application and/or traversing a network adapter of client device 10. Such interceptors may implement communication protocols such as HTTP, Web-Socket, and MQTT, among others, to parse communications and extract structured message data. When instant messages are encrypted, some embodiments may employ techniques such as man-in-the-middle (MITM) to decrypt traffic for message content extraction. Yet other exemplary embodiments may intercept and access messages before they reach their intended destination (client device 10). Such interception may occur on a messaging server (e.g., email server) or on a gateway device enabling client device 10 to access an extended network such as the Internet.

In some embodiments, telemetry module 38 (FIG. 4) is configured to determine a set of telemetry data characterizing respective client device 10. Telemetry data comprises data characterizing a respective client device and/or a manner in which the respective device is used. Exemplary telemetry data includes an indicator of a device type (e.g., smartphone vs. personal computer), an indicator of a make and model (e.g., Apple iPhone® 14), an identifier of a make and version of OS 30 (e.g., Android® v.13), an indicator of a telecom carrier (e.g., Vodafone®), and a location indicator (e.g. geolocation, country).

Other telemetry data collected by module 38 may include a set of identifiers of various computer programs installed on client device 10. Some embodiments may enumerate currently installed applications 32 and determine an identifier for each such application. An exemplary application identifier comprises an integrity hash, i.e., a hash function evaluated on a content of a memory section of client device 10, the respective memory section storing at least a part of the code of the respective application 32.

Yet other telemetry data collected by module 38 may include an indicator of usage of the respective client device, for instance an indicator of a count of launches of each application 32, an indicator of an amount of time each application 32 is open/in use, an indicator of an amount of time each application 32 is in focus (i.e., actually interacting with the user, having a UI displayed on a screen of client device 10, etc.). Other exemplary device-use telemetry data may include an indicator of an amount of data (traffic) received and/or transmitted by client device 10 while using each application 32, and a set of domain names or network/Internet protocol (IP) addresses most frequently accessed by device 10.

Embodiments may use any method known in the art to determine telemetry data, such as calling specific functions of OS 30, exploiting accessibility APIs, hooking specific functions or APIs, etc. Telemetry data may be packaged as telemetry indicators 22 and transmitted to server 16 according to a schedule (e.g., every day) or in response to selected events, such as installation of new software on client device 10. An exemplary telemetry indicator 22 may include a set of telemetry data and an identifier of the respective client device, an identifier of a user of device 10, and/or an identifier of a subscription/service account associated with device 10 or its user.

In some embodiments, client-side communication module 39 (FIG. 4) manages communication between the respective instance of security agent 34 and security server 16. Managing communication may include sending message digests 20 and telemetry indicators 22, and receiving security notifications 24. Module 39 may further generate and transmit device identification data enabling security server 16 to unambiguously associate message digests and telemetry data with the respective client device 10.

Figure 8:
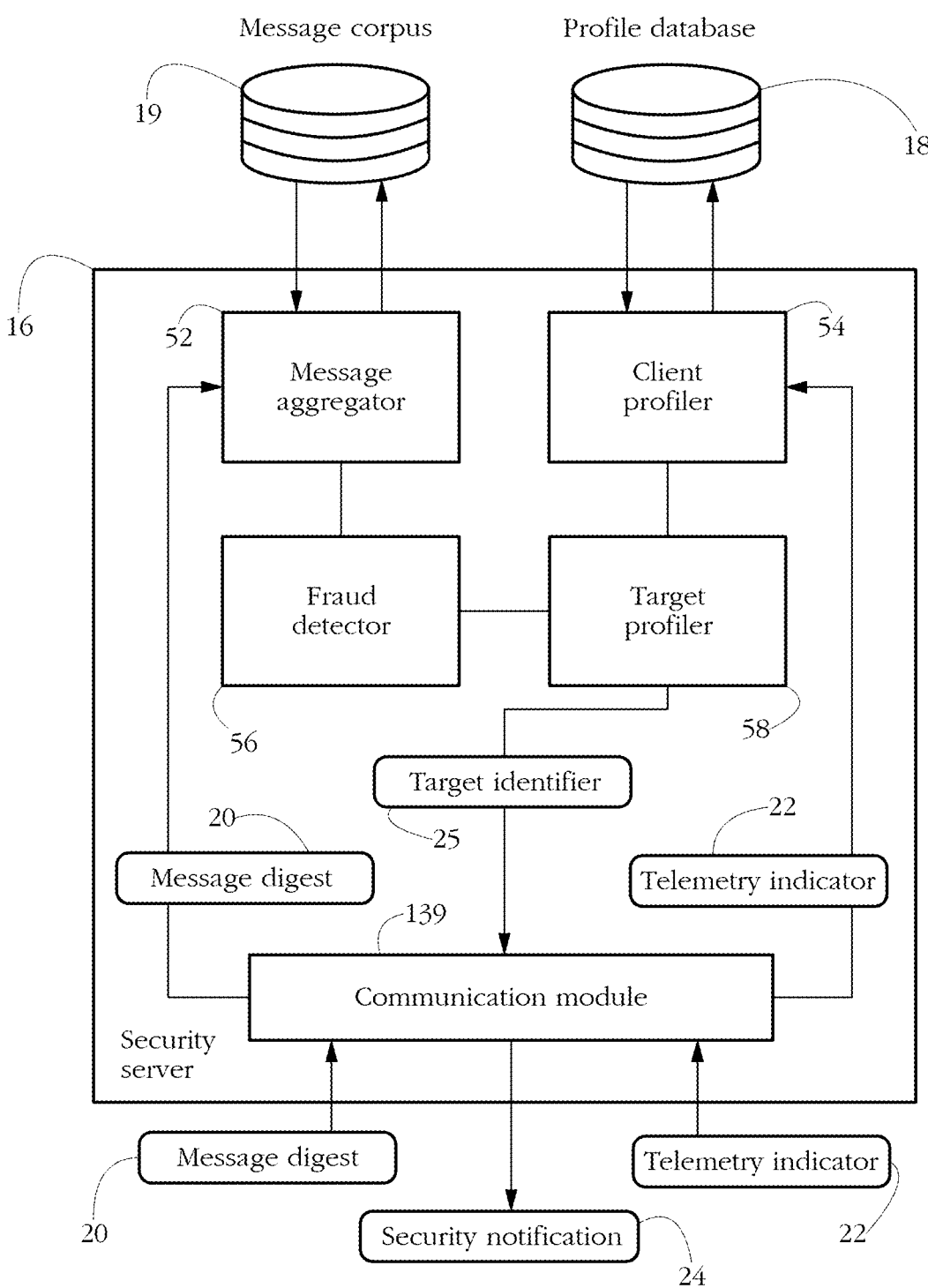
FIG. 8 shows exemplary components a security server according to some embodiments of the present invention.

FIG. 8 shows exemplary components of security server 16 according to some embodiments of the present invention. The illustrated components may be embodied as computer programs that may or may not execute on the same processor/physical machine. A skilled artisan will know that some or all of the illustrated components may also be implemented in hardware, for instance in a dedicated chip (field-programmable gate array—FPGA or application-specific integrated circuit-ASIC).

In some embodiments as illustrated, as server-side message aggregator 52 is communicatively coupled to a fraud detector module 56. Message aggregator is configured to receive, store, and further process incoming message digests 20 received from clients, for instance to group messages into groups/clusters, as further described below. Fraud detector module 56 is configured to identify fraudulent messages according to digests 20. A client profiler module 54 may construct profiles of protected client devices 10a-f according to telemetry data received from the respective clients. A target profiler 56 is configured to collaborate with client profiler 54 to determine a target identifier 25 indicating a potential target for notification (see e.g., target 210 in FIG. 2). A server-side communication module 139 connected to message aggregator 52, client profiler 54 and target profiler 58 may be configured to manage communications with client devices 10a-f, e.g., to receive message digests 20 and telemetry indicators 22, and to formulate and send out security notifications 24 to client devices identified by target indicator 25.

Figure 9:
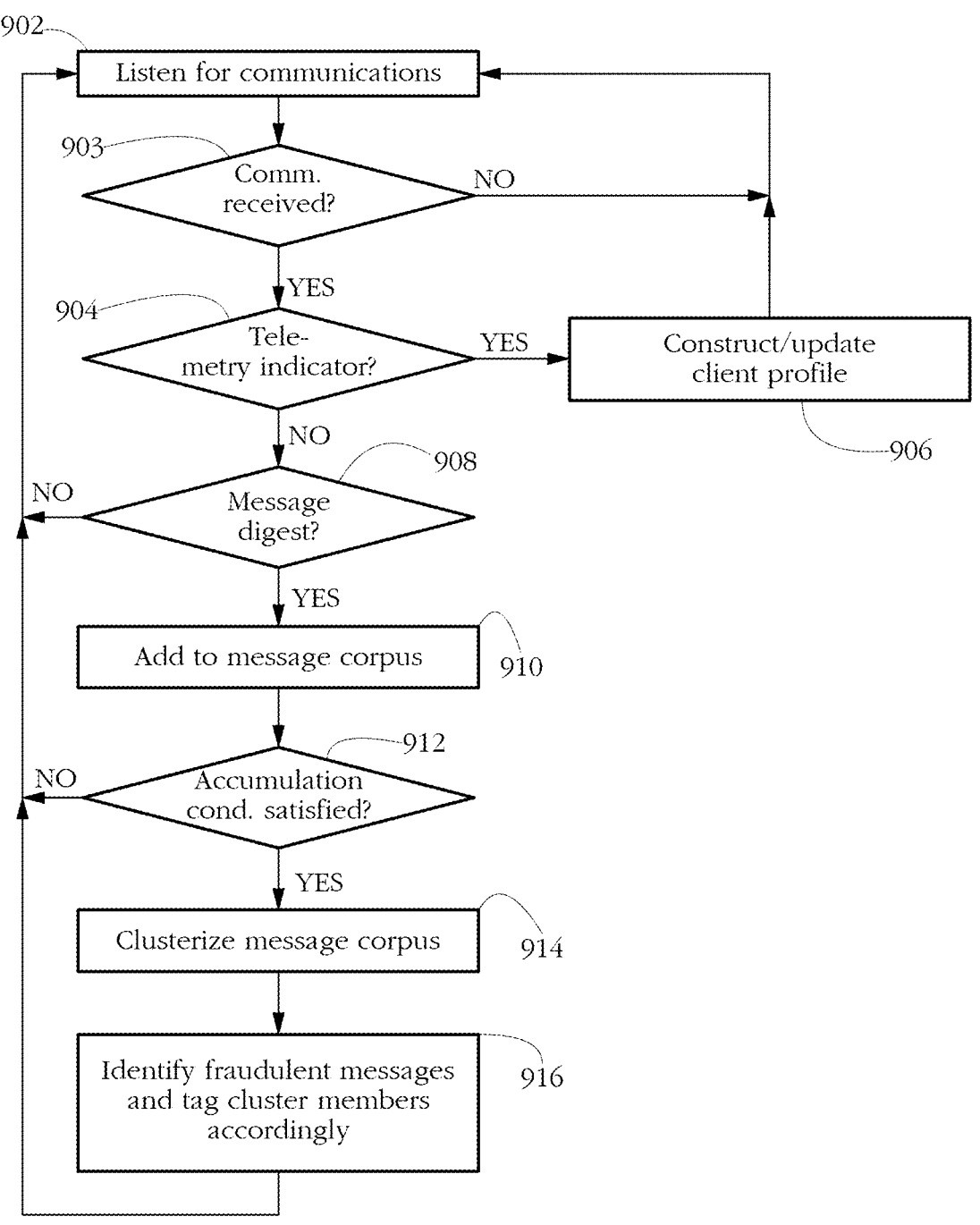
FIG. 9 shows an exemplary sequence of steps carried out by the security server according to some embodiments of the present invention.

FIG. 9 shows an exemplary sequence of steps performed by security server 16 according to some embodiments of the present invention. A sequence of steps 902-903 may listen for incoming communications from clients. When a communication is received, a step 904 may determine whether it comprises a telemetry indicator 22. If yes, in a step 906, client profiler 54 may identify a client device that transmitted the respective telemetry indicator, and may create or update a client profile determined for the respective client device according to the received telemetry data.

Figure 10:
FIG. 10 shows an exemplary client profile according to some embodiments of the present invention.

An exemplary client profile 60 according to some embodiments of the present invention is illustrated in FIG. 10 and comprises an identifier of the respective client device (client ID) and a set of usage indicators $u_1 \ldots u_N$ determined according to telemetry data received from the respective client device, the usage indicators $u_i$ collectively characterizing a typical manner in which the respective client device is used. Some embodiments allow storing multiple client profiles 60 for the same client device (same client ID, distinct user IDs), based on the observation that some client devices 10a-f such as personal computers and smart TVs, among others, are typically used by more than one user, and that the way in which the respective device is being used may differ among the respective users.

Some exemplary usage indicators $u_i$ are indicative of how much the respective device and/or user of the respective device uses various computer programs (e.g., applications 32 in FIG. 3). In one such example, each usage indicator $u_i$ may be associated with a distinct computer program/application 32 installed on the respective client device. Stated otherwise, there may be one usage indicator $u_j$ associated with a Facebook® client application, and another usage indicator $u_k$ associated with a Twitter® client application. An exemplary usage indicator $u_i$ may include a unique identifier of the respective application (an integrity hash, a combination of an application name and version indicator, etc.) and a set of indicators $w_i$ quantifying an absolute or relative usage of the respective application on the respective device. Exemplary usage indicators $u_i$ may be determined according to an amount of time the respective application is open and/or in focus, a count of launches of the respective application, an amount of data transmitted and/or received by the respective application, or a combination thereof. The respective amounts and/or counts may be determined relative to a standard time interval (e.g., per month, per day), and may be further determined as a proportion (e.g., fraction, percentage) with respect to a cumulative usage including of other computer programs executing on the respective device. Some usage indicators $u_i$ may quantify a departure of a measured usage from an average value determined for a reference population of client devices. The reference population may be selected according to various criteria, such as geographical location (e.g., average usage in a respective country), age of user (e.g., average usage among teenagers), language of the respective UI, etc. The departure from the average may be expressed in any manner known in the art, for instance according to a standard deviation of the set of reference values.

In alternative embodiments, each usage indicator $u_i$ may be associated with a distinct category of computer programs/applications, indicator $u_i$ denoting an amount or extent to which the respective device/user uses applications from the respective category. In other words, such a usage indicator $u_i$ may combine data quantifying the usage on the respective device of multiple applications from the respective category. Distinct categories may correspond for example to distinct user interests (music vs. weather vs. sports vs. social media), distinct types of activity (e.g., banking vs. instant messaging vs. gaming vs. streaming), etc. An exemplary category may lump together applications enabling a user to engage with social networks (e.g., Facebook®, Instagram®, Snapchat®, X®, etc.). Another category may group instant messaging applications (e.g., WhatsApp®, Telegram®, Signal®, etc.). Yet another exemplary category may group applications providing user-submitted video (YouTube®, TikTok®, etc.). Another category may group together online banking applications from multiple banks. Yet another exemplary category may gather applications enabling users to send and receive parcels. Some categories may not be mutually exclusive, i.e., selected applications may be included in more than one category. To determine/update such usage indicators, some embodiments of client profiler 54 maintain a mapping between applications and categories and match an application identifier received as part of a telemetry indicator 22 to its corresponding application category.

Alternatively or additionally, some usage indicators $u_i$ may be associated with specific types of web service (e.g., JSON-remote procedure call vs. representational state transfer—REST), such indicators $u_i$ denoting an amount or extent to which the respective device/user uses the respective web service. Yet other usage indicators $u_i$ may be associated with specific Internet domains or categories of Internet domains, such indicators denoting an amount or extent of usage of the respective Internet domains by the respective client device.

Some usage indicators may indicate a typical/average breakup of user activity during various time periods (morning, working hours, night, workdays, weekends, etc.). Usage indicators as described herein may also vary on longer time scales, reflecting changes in the user's interests, habits, lifestyle, and work routine. Some embodiments receive periodic updates of telemetry data (e.g., every day, every month) from client devices and update the respective usage indicators by replacing an existing $u_i$ value with an updated one determined exclusively according to the latest telemetry. Stated otherwise, some embodiments only store the most recent usage indicator values. Alternative embodiments may update $u_i$ values by combining current with previously determined usage data, amounting to averaging the respective usage information over longer periods of time. Some embodiments calculate usage indicators over a sliding time window of pre-determined duration (e.g., a few weeks or months), discarding any usage indicators older than a threshold and adding newly computed usage data.

In some embodiments, client profile 60 may further include indicators of a hardware device type of the respective client device (e.g., smartphone, tablet computer, personal computer, etc.), and/or of a type and/or version of an OS installed on the respective device. Such embodiments rely on the observation that some online fraud attempts explicitly target specific device types and/or operating systems. Yet other components of profile 60 may indicate a geographical or network location of the respective device (e.g., country, network domain, etc.), relying on the observation that some online fraud attempts specifically target victims from certain countries, and/or clients of certain Internet service providers or telecom companies.

Some embodiments store client profiles 60 in a profile database 18 communicatively coupled to client profiler 54 and target profiler 58. Database 18 herein denotes any organized collection of data enabling a selective retrieval, insertion, and/or update of a client profile according to an identifier of a client device and/or a user. Database 18 may implement any data format and lookup strategy known in the art.

When step 904 (FIG. 9) returns a NO, a further step 908 may determine whether the current communication comprises message digest data. When YES, in a step 910 message aggregator 52 may add the received data to a message corpus. In some embodiments as illustrated, a message corpus 19 comprises a database communicatively coupled to message aggregator 52, the respective database comprising any ordered collection of data enabling a selective retrieval and/or insertion of message digest data according to an identifier of a respective message, client device, and/or user. An exemplary message corpus 19 may comprise a repository of message digests 20 (see e.g., FIG. 5), wherein the client ID and/or message ID fields may be used as lookup indices. Corpus 19 may be implemented using any data format and lookup strategy known in the art.

In some embodiments, message aggregator 52 is further configured to clusterize messages according to message digest data stored in corpus 19 (a step 914 in FIG. 9). However, such clusterization may carry a substantial computational cost and therefore some embodiments only carry out step 914 occasionally, for instance when a data accumulation condition is satisfied (a step 912 returns a YES). An exemplary step 912 determines whether an amount of time elapsed and/or a count of message digests 20 received since a previous clusterization exceeds a pre-determined threshold.

Figure 11:
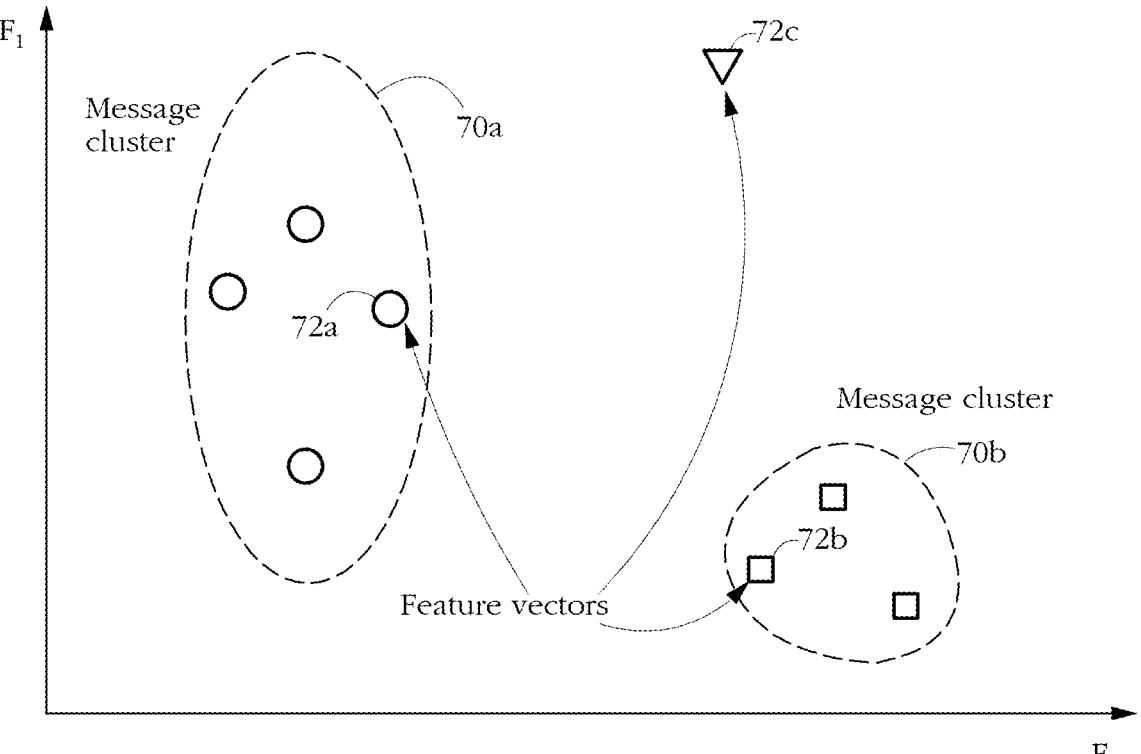
FIG. 11 illustrates exemplary message feature vectors and message clusters according to some embodiments of the present invention.

Message clusterization herein denotes dividing a collection of messages into groups/clusters, so that members of the same cluster are similar according to selected message features. FIG. 11 shows an exemplary message clusterization visualized in a two-dimensional feature space spanned by two exemplary message features $F_1$ and $F_2$. An artisan will know that the count and choice of message features is only illustrative and that an actual feature space may comprise much more dimensions (e.g., thousands). Individual messages are represented as feature vectors 72a-b-c. Feature vectors are grouped into clusters 70a-b according to proximity in feature space, which translates to having similar features. Distinct members of a message cluster typically represent messages received by distinct client devices 10a-f. In other words, a single cluster may group messages received by several distinct client devices/users.

In a simple exemplary embodiment, each axis of a message feature space may correspond to a distinct message feature as described above in relation to FIG. 5, so that a position of each feature vector 72a-b-c in space is given by the set of coordinates $\{f_1, \ldots, f_M\}$, wherein $f_i$ is the value of message feature $F_i$ evaluated for a respective message. However, in alternative embodiments, some axes may represent combinations of individual features $F_i$, such as a principal component (PC) of the respective set of features. To clusterize a set of messages, aggregator 52 may employ any method known in the art of data mining, for instance a version of k-nearest neighbors' (KNN) algorithm, among others. An outcome of step 914 may comprise a set of message clusters, wherein some clusters may represent promotional offers, while other clusters may represent distinct waves of unsolicited communication (spam). Other clusters may consist of personal or work-related messages. In some embodiments, some clusters may consist of fraudulent messages. In one such example, a selected message cluster may consist of messages belonging to an online fraud campaign comprising fake parcel delivery notifications, while another cluster may consist of fraudulent messages inviting users to log into a fake online banking interface. In some embodiments, step 914 comprises creating an association mapping each message digest 20 of message corpus 19 to a corresponding message cluster. An exemplary mapping may be achieved by having a selected message feature value $f_c$ indicate a message cluster that the respective message belongs to.

In some embodiments, in a further step 916 (FIG. 9), fraud detector 56 may execute a fraud detection procedure to identify fraudulent messages within corpus 19. Step 916 may employ any method known in the art of computer security. For instance, some message features $F_i$ may be fraud-indicative, either on their own or when correlated to other message features $F_j$. Therefore, some individual feature values $f_i$ or specific combinations of feature values $\{f_i, f_j\}$ may indicate that a respective message is fraudulent. Some embodiments of fraud detector 56 may implement a decision tree according to feature values $f_i$, wherein a particular path traversing the decision tree indicates that the respective message is fraudulent. More sophisticated implementations of fraud detector may use artificial intelligence, for instance an artificial neural network configured to input a tuple of message feature values $\{f_i, f_j, \ldots f_k\}$ and in response, output a verdict of whether the respective message is fraudulent. The respective neural network may be pretrained on a message corpus consisting of known fraudulent and benign messages.

Some embodiments further employ message metadata for fraud detection. For instance, the timing of receipt may encode valuable information, based on the observation that legitimate messages approximately follow a predictable temporal pattern, while fraudulent messages are typically more intermittent, with large spikes (numerous messages in quick succession) followed by long quiet periods.

In some embodiments, a determination that a selected message is fraudulent automatically causes fraud detector 56 to mark other members of the same cluster (e.g., the entire cluster) as fraudulent. Clustering therefore conveniently enables some embodiments to automatically identify messages forming a part of the same wave/campaign of fraudulent messages, even though such messages may differ in their exact wording and may be addressed to different users and devices. Some embodiments mark a message as fraudulent by setting a particular flag/message feature of a message digest associated with the respective message.

Figure 12:
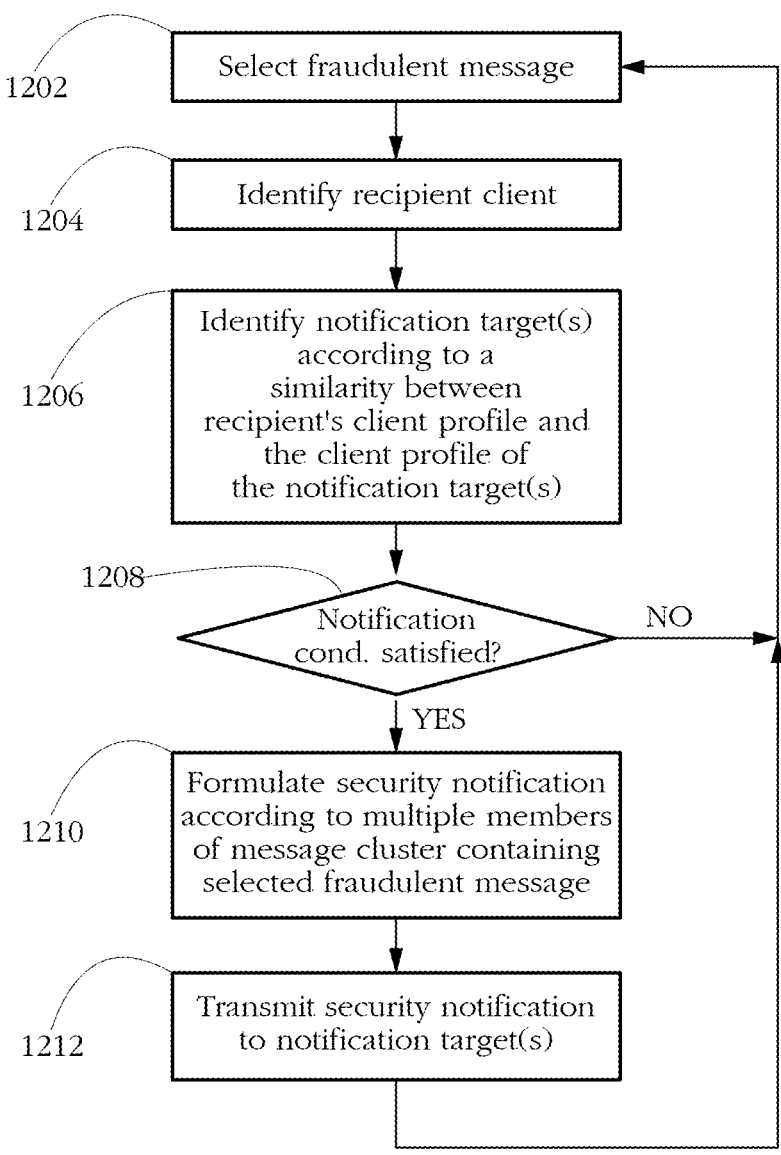
FIG. 12 shows an exemplary sequence of steps carried out by the security server according to some embodiments of the present invention.

Having identified at least one fraudulent message among message corpus 19, some embodiments may proceed to send out targeted security notifications to other client devices (see e.g. FIG. 2). An exemplary sequence of steps implementing a targeted notification procedure is shown in FIG. 12. The illustrated sequence may be executed in response to steps 914-916 in FIG. 9. A step 1202 selects a message identified as fraudulent by fraud detector 56. In response, a further step 1204 identifies a recipient of the respective message, for instance according to a content of a client ID field of a message digest representing the respective message (see e.g., FIG. 5).

In a further step 1206, target profiler 58 may identify a notification target from among client devices 10a-f according to a client profile of the message recipient identified in step 1204. Some embodiments select a notification target having a similar client profile to the message recipient, relying on the observation that fraud campaigns typically target users that have similar types of devices and/or similar usage habits and interests. Step 1206 may comprise selecting a set of candidate devices from client devices 10a-f and for each candidate device, determine a measure of similarity between a client profile of the message recipient and a client profile of the candidate device, and select the notification target from among the candidate devices according to the similarity of client profiles. In one such example, target profiler 58 may select as the notification target the candidate device whose client profile is most similar to that of the message recipient. In another example, target profiler 58 may compare the evaluated similarity measures to a predetermined threshold and select notification target(s) according to a result of the comparison. In some embodiments, no notification target is selected if none of the candidate devices is sufficiently similar to the message recipient.

Target profiler 58 may employ any method or formula known in the art to determine a similarity measure between two client usage profiles. One exemplary embodiment may determine a profile similarity measure according to:

$$S = \sum_{i=1}^{N} \propto_i \left| u_i^A - u_i^B \right|^q, \qquad [1]$$

wherein $$u_i^A$$

denotes the i-th usage indicator of client device A, $$u_i^B$$

denotes the i-th usage indicator of client device B, $\propto_i$ denotes a numerical weight used to adjust the relative contribution of various usage indicators i to the similarity measure, and q denotes a positive number. (Please refer to FIG. 10 for an illustration of client profile 60 and usage indicators $u_i$.) Another exemplary embodiment may determine a profile similarity measure according to a cosine distance between the client profiles of devices A and B.

In response to identifying a notification target, security server 16 may proceed to notify the respective client device. However, in a step 1208, some embodiments first determine whether a notification condition is satisfied, and actually notify the selected target only if yes. An exemplary notification condition requires that at least one notification target has been reliably identified. Another exemplary notification condition may require that the identified notification target has not recently received similar notifications (to avoid annoying a user of the respective client device with excessive notifications). Other exemplary notification conditions comprise evaluating a degree of risk associated with the respective type of fraudulent message. For instance, some embodiments may prioritize notifications of financial fraud over other types of online fraud. In some embodiments, step 1208 may determine the current reach of a respective fraudulent campaign (e.g., count of client devices that have already received similar messages, as encoded, for instance in a count of members of the current message cluster), and determine whether the notification condition is satisfied according to the current reach. Yet other exemplary notification conditions are evaluated according to a client profile of the identified notification target. In one such example, when the respective user/device is a heavy user of online games, some embodiments may prioritize notifications of game-related fraud campaigns.

A step 1210 may formulate security notification 24 informing a user of the respective client device of the likelihood of receiving a fraudulent message having at least some of the characteristics of the message selected in step 1202. Notification 24 may further instruct the user on how to proceed in case he/she actually receives such a message and may direct the user to a set of online resources for fraud prevention.

Some embodiments rely on the observation that sophisticated fraud campaigns rarely distribute identical messages to distinct users/devices, but nevertheless, all messages belonging to the same fraud campaign/wave are specifically crafted to achieve the same fraudulent goal. Meanwhile, the substantial variability of individual messages is captured within message corpus 19 and may allow extracting more general characteristics of a fraud campaign for the benefit of users. In step 1210, some embodiments therefore formulate notification 24 according to characteristics of multiple fraudulent messages, instead of just the message selected in step 1202. For instance, notification 24 may include information derived from multiple members of a message cluster that includes the selected fraudulent message, since members of the same cluster are substantially similar to each other.

One exemplary embodiment may employ a generative language model to determine a set of textual or semantic traits common among members of a message cluster that includes the selected fraudulent message, and include such traits in notification 24. Additionally or alternatively, a GLM may be requested to formulate a summary of multiple fraudulent messages from the same cluster. Communication module 139 may then include the generated summary in notification 24. Another exemplary embodiment may include actual excerpts from multiple messages of the respective cluster in notification 24, illustrating to a user some possible variations in the content of a fraudulent message. A further step 1212 may transmit notification 24 to the identified notification target.

Figure 13:
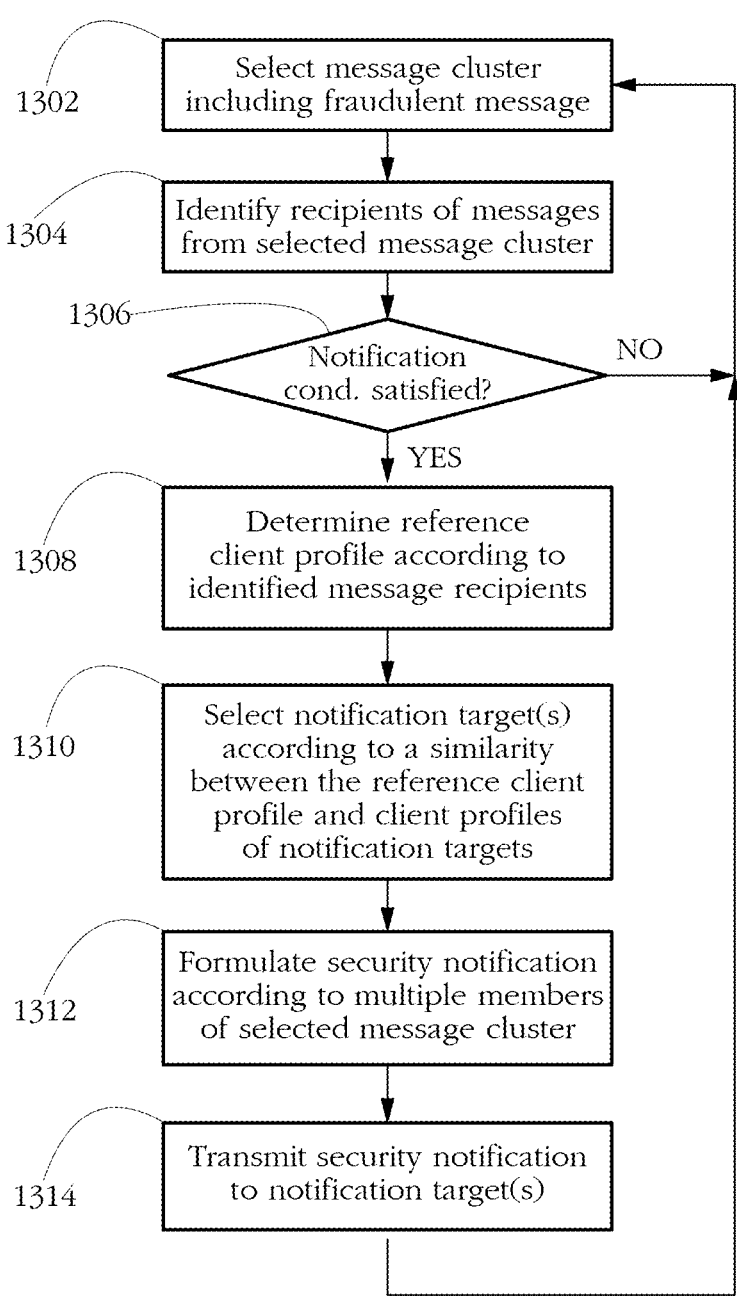
FIG. 13 shows an alternative exemplary sequence of steps performed by the security server according to some embodiments of the present invention.

FIGS. 13 and 14 show other methods of performing a targeted security notification according to some embodiments of the present invention. The illustrated procedures may represent alternatives of specific variants of the method illustrated in FIG. 12.

In contrast to the procedure shown in FIG. 12, the sequence of steps shown in FIG. 13 selects a whole cluster of messages (a step 1302). However, the respective cluster is chosen to have at least one fraudulent message. For each member of the respective cluster, a step 1304 may identify a recipient of the respective message, producing a collection of recipient devices having received messages that are either fraudulent or similar to a fraudulent message.

A step 1306 may then check whether the respective collection of client devices satisfies a notification condition. Such embodiments rely on the observation that not all online fraud campaigns are targeted. When fraudulent messages are sent at random, a targeted notification is not possible because there is no preferential client profile associated with the respective campaign. In such cases, employing the method illustrated in FIG. 12 may amount to notifying randomly selected devices (or all protected devices 10a-f), which risks alienating users and/or causing a lot of false alarms.

To avoid sending out notifications in situations like this, some embodiments may determine for instance whether the collection of clients identified in step 1304 has a distinctive client profile. Some embodiments may determine an average pairwise similarity between client profiles of devices identified in step 1304. In one example of such a calculation, target profiler 58 may apply Eq. [1] to all pairs of client devices in the collection, and then average over the number of pairs. A relatively high average similarity may indicate that recipients of messages from the respective fraudulent cluster have similar profiles, and thus that a targeted notification is efficient and desirable. Meanwhile, a relatively low average similarity may indicate that the profiles of the respective message recipients vary substantially, and therefore the respective fraudulent campaign is not suitable for targeted notification. Step 1306 may compare the respective average similarity to a pre-determined threshold, and determine whether the notification condition is satisfied according to a result of the comparison. The value of the threshold may be adjusted (for instance according to user preferences), thereby controlling the amount or frequency of notifications.

If the notification condition is satisfied (step 1306 returns a YES), a step 1308 may determine a reference client profile according to the collection of client devices identified in step 1304. In one exemplary embodiment, the reference client profile is chosen from the client profiles of the collection of clients. Stated otherwise, the reference profile may belong to an actual client device from the collection. The respective client device may be chosen according to an average similarity between its client profile and the client profiles of the other members of the collection, for instance as the profile that is on average most similar to all other client profiles.

Another exemplary embodiment may determine the reference profile as an average of the client profiles of the collection of client devices identified in step 1304. An exemplary average profile may be determined for instance by averaging each usage indicator $u_i$ over the respective collection of client devices.

In a further step 1310, target profiler 58 may then select a notification target from among protected client devices 10a-f according to a similarity between the reference client profile and client profiles of target candidates. For instance, profiler 58 may select notification targets whose usage profiles are substantially similar to the reference profile. Again, some embodiments may compare a similarity measure to a pre-determined threshold and determine whether a candidate device is selected for notification according to a result of the comparison. Further steps 1312-1314 formulate notification 24 and send out notification 24 to the selected notification target.

In contrast to both FIGS. 12 and 13, the exemplary targeted notification procedure illustrated in FIG. 14 clusterizes protected client devices 10*a-f* according to their respective client profiles 60. In other words, a step 1402 divides client devices 10*a-f* into distinct groups/clusters that reflect similarities between their members' profiles. Step 1402 may employ any clustering algorithm known in the art, such as KNN, among others.

The illustrated method proceeds with a sequence of steps 1404-1406 wherein target profiler 58 selects a message cluster having at least one fraudulent message, and for each member of the respective message cluster identifies a recipient of the respective message. The outcome of step 1406 therefore comprises a collection of client devices having received messages from the selected cluster. A step 1408 may determine whether a notification condition is satisfied according to the identified collection of client devices. In some embodiments, the notification condition may require that all members of the collection belong to the same device cluster, i.e., be sufficiently similar in profile as to be part of a single cluster of devices.

If the notification condition is satisfied, a step 1410 may select notification target(s) from among members of the device cluster(s) that include the collection of clients identified in step 1406. Further steps 1412-1414 formulate security notification 24 and transmit notification 24 to the selected notification target(s). Security notification 24 may be formulated according to multiple members of the message cluster selected in step 1404, as described above in relation to step 1210 in FIG. 12.

Figure 15:
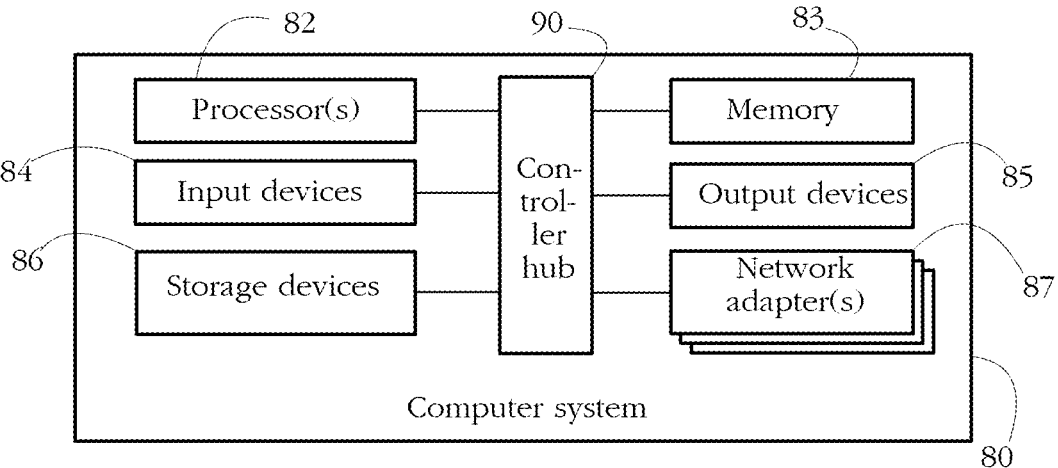
FIG. 15 shows an exemplary hardware configuration of a computer system programmed to execute some of the methods described herein.

Anti-fraud systems as described above may be implemented as computer programs (software) executing on at least one hardware processor of a physical machine/computer system. However, a skilled artisan will know that at least some of the illustrated components may be implemented in dedicated hardware, such as a set of field-programmable gate arrays (FPGA) or application-specific integrated circuits (ASIC). FIG. 15 shows an exemplary hardware configuration of a computer system 80 programmed to execute some of the methods described herein. Computer system 80 generically represents any of client devices 10*a-f* in FIG. 1, as well as security server 16, among others. The illustrated device is a personal computer; other devices such as servers, mobile telephones, tablet computers, and wearables may have slightly different configurations.

Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Memory unit 84 may comprise volatile computer-readable media (e.g. dynamic random-access memory-DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 comprise specialized hardware that enable computer system 80 to connect to an electronic communication network and/or to other devices/computer systems for data transmission and reception.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above enable efficiently protecting users against online fraud such as phishing, among others.

Fighting online fraud is typically a two-pronged endeavor. One category of activities comprises detecting fraudulent messages and preventing them from reaching their intended targets. Meanwhile, another activity which is beneficial to combating fraud is warning users about such threats. However, the sheer amount of fraudulent messaging creates a substantial problem in deciding when and how to warn potential victims. As shown by numerous computer experiments, as well as actual user feedback, flooding users with warnings about current or potential threats seriously impacts user experience, causing users to ignore warnings, or even to turn against fraud-prevention technologies.

Some embodiments of the present invention explicitly address such shortcomings by performing a targeted transmission of warning messages, as opposed to indiscriminately warning users about emerging threats. A security server harvests telemetry data from a plurality of protected client devices, such as smartphones, personal computers, wearables, and smart home appliances. Such telemetry data is used to construct a client profile of each client device, the client profile broadly indicating a manner of usage of the respective device. The client profile may indicate, for instance, what applications/computer programs are installed on the respective device, and how much each of the respective application is being used. In some embodiments, installed applications are divided into categories/groups according to various criteria, and the respective client profile is indicative of an amount or extent to which a user of the respective client device uses software from the respective category. Alternatively or additionally, a client profile may indicate an amount or an extent to which the respective device uses specific web services and/or Internet domains. A client profile according to some embodiments of the present invention may further indicate, among others, a set of hardware characteristics of the respective device, a geographical and/or network location of the respective device, and an Internet/telecom service provider used by the respective device.

Some embodiments further extract various message features from messages received by client devices and use such features to determine whether a respective message is likely fraudulent. Some embodiments perform a clustering procedure to divide incoming messages into clusters according to a similarity of message features. In response to detecting a fraudulent message, some embodiments retrieve a client profile of the respective recipient device, and then select a notification target from among the protected client devices, the notification target selected according to a measure of similarity between the client profile of the recipient of the fraudulent message and the client profile of the notification target. Stated otherwise, some embodiments only transmit warnings to client devices whose profile is sufficiently similar to that of an actual message recipient.

Such targeted notification procedures rely on the observation that some online fraud campaigns are not distributed randomly or indiscriminately, but instead attempt to target clients having specific interests and/or habits. For instance, a specific wave of fraudulent messages may target frequent users of a specific category of applications. One fraud campaign may target users who often shop online and who use various courier service applications to track their parcels. Another fraud campaign comprising investment scam messages may target users who spend a lot of time or generate a lot of data traffic on stock market-related applications and websites. Yet other online fraud campaigns disproportionately target specific hardware types (e.g., smartphones running Android) and/or users located in a specific country or region, users relying on a specific Internet service provider, etc. In such situations, indiscriminately warning all users about the likelihood of receiving the respective type of fraudulent message is impractical and counterproductive, since most of the users are not in the intended target of the respective scam wave. In contrast, a targeted warning strategy according to some embodiments of the present invention is efficient and beneficial, since it is likely to reach the most likely victims.

Messages belonging to the same wave or fraud campaign may vary substantially in form and phrasing. Similarly, no two users have precisely the same pattern of using a device, so client profiles may vary substantially, even among users sharing a lot of habits and interests. Some embodiments explicitly account for such variability by using clustering techniques to automatically identify groups of similar messages and groups of devices having substantially similar profiles. Looking up the recipients of a whole cluster of similar messages enables some embodiments to select a robust target for notification, wherein the respective target is selected to be on average sufficiently similar to multiple message recipients.

A notable advantage of some embodiments of the present invention is that they avoid some of the technical problems and pitfalls associated with conventional fraud detection. Especially in the age of artificial intelligence, some fraudulent messages are so sophisticated that they are really difficult to distinguish from legitimate ones. In such cases, a conventional fraud detection procedure based on message similarity is likely to have an unacceptable rate of false positives (legitimate messages wrongly identified as fraudulent). In contrast, some embodiments of the present invention, membership in a message cluster is not necessarily indicative of whether a respective message is fraudulent or not. The methods described herein only require identification of a cluster of messages that are sufficiently similar to a known fraudulent message. In one use-case scenario, a messages cluster may group together messages notifying users about imminent parcel deliveries. However, some of the cluster members may be legitimate notifications, while others may be fraudulent. Some embodiments allow warning other potential receivers of similar messages that the respective messages may be fraudulent. Furthermore, by formulating the security notification according to multiple messages of the respective cluster (potentially including fraudulent as well as legitimate messages) allows illustrating and explaining to the user how legitimate messages are being manipulated and transformed by fraudsters, thus increasing awareness and resistance to online fraud.

Some of the methods described herein further allow automatically and selectively enabling or disabling targeted notifications according to the observed characteristics of each message cluster or fraud campaign. In response to selecting a cluster of similar messages (e.g., a fraud wave or fraud campaign) and identifying the respective message recipients, some embodiments may determine whether the respective fraud campaign is targeted or not according to client profiles of the respective group of recipients. A substantially similar group of client profiles may indicate a targeted campaign. Conversely, a collection of dissimilar client profiles may indicate an indiscriminate fraud campaign. Some embodiments may automatically turn off notifications in the case of indiscriminate fraud campaigns, to avoid annoying clients with excessive notifications.

It will be clear to one skilled in the art that the above embodiments may be altered in many ways without departing from the scope of the invention. Accordingly, the scope of the invention should be determined by the following claims and their legal equivalents.

The invention claimed is:
1. A computer system comprising at least one hardware processor configured to:
in response to determining that a selected message received by a client device is fraudulent, select a group of messages from a message corpus according to a similarity between members of the group of messages and the selected message;
in response to selecting the group of messages, identify a group of recipient devices comprising recipients of members of the selected group of messages;
determine whether a notification condition is satisfied according to a similarity between members of the identified group of recipient clients;
in response to determining that the notification condition is satisfied, identify a target device according to a similarity between a usage indicator of the target device and a usage indicator of a selected member of the group of recipient devices, the usage indicator of the target device quantifying a usage of a selected computer program by the target device; and
transmit a security notification to the target device, the security notification formulated according to a content of multiple members of the group of messages and informing a user of the target device of a likelihood of receiving a fraudulent message similar to the selected message.

2. The computer system of claim 1, wherein the usage indicator is determined according to an amount of time elapsed while using the selected computer program on the target device.

3. The computer system of claim 1, wherein the usage indicator is determined according to an amount of data transmitted or received by an instance of the selected computer program executing on the target device.

4. The computer system of claim 1, wherein the usage indicator is determined according to a count of launches of the selected computer program on the target device.

5. The computer system of claim 1, wherein the usage indicator is determined according to an amount of data exchanged by the target device with a selected Internet domain.

6. The computer system of claim 1, wherein the usage indicator is determined according to a count of times the target device accesses a selected Internet domain.

7. The computer system of claim 1, further configured to:
employ a generative language model to determine an embedding vector of at least a part of the selected message; and
determine the similarity between members of the group of messages and the selected message according to the embedding vector.

8. The computer system of claim 1, further configured to:
divide a plurality of client devices including the group of recipient devices into a plurality of clusters according to a similarity between members of the plurality of client devices; and
identify the target device according to whether the target device and the selected member of the group of recipient devices are members of the same cluster of the plurality of clusters.

9. The computer system of claim 1, further configured to:
divide a plurality of client devices including the group of recipient devices into a plurality of clusters according to a similarity between members of the plurality of client devices; and
determine whether the notification condition is satisfied according to whether the group of recipient devices is distributed among multiple clusters of the plurality of clusters.

10. The computer system of claim 1, wherein the selected group of messages includes legitimate messages.

11. A method of preventing online fraud comprising employing at least one hardware processor of a computer system to:
in response to determining that a selected message received by a client device is fraudulent, select a group of messages from a message corpus according to a similarity between members of the group of messages and the selected message;
in response to selecting the group of messages, identify a group of recipient devices comprising recipients of members of the selected group of messages;
determine whether a notification condition is satisfied according to a similarity between members of the identified group of recipient clients;
in response to determining that the notification condition is satisfied, identify a target device according to a similarity between a usage indicator of the target device and a usage indicator of a selected member of the group of recipient devices, the usage indicator of the target device quantifying a usage of a selected computer program by the target device; and transmit a security notification to the target device, the security notification formulated according to a content of multiple members of the group of messages and informing a user of the target device of a likelihood of receiving a fraudulent message similar to the selected message.

12. The method of claim 11, wherein the usage indicator is determined according to an amount of time elapsed while using the selected computer program on the target device.

13. The method of claim 11, wherein the usage indicator is determined according to an amount of data transmitted or received by an instance of the selected computer program executing on the target device.

14. The method of claim 11, wherein the usage indicator is determined according to a count of launches of the selected computer program on the target device.

15. The method of claim 11, wherein the usage indicator is determined according to an amount of data exchanged by the target device with a selected Internet domain.

16. The method of claim 11, wherein the usage indicator is determined according to a count of times the target device accesses a selected Internet domain.

17. The method of claim 11, further comprising employing the at least one hardware processor to:
employ a generative language model to determine an embedding vector of at least a part of the selected message; and
determine the similarity between members of the group of messages and the selected message according to the embedding vector.

18. The method of claim 11, further comprising employing the at least one hardware processor to:
divide a plurality of client devices including the group of recipient devices into a plurality of clusters according to a similarity between members of the plurality of client devices; and
identify the target device according to whether the target device and the selected member of the group of recipient devices are members of the same cluster of the plurality of clusters.

19. The method of claim 11, further comprising employing the at least one hardware processor to:
divide a plurality of client devices including the group of recipient devices into a plurality of clusters according to a similarity between members of the plurality of client devices; and
determine whether the notification condition is satisfied according to whether the group of recipient devices is distributed among multiple clusters of the plurality of clusters.

20. The method of claim 11, wherein the selected group of messages includes legitimate messages.

21. A non-transitory computer-readable medium storing instructions which, when executed by at least one hardware processor of a computer system, cause the computer system to:
in response to determining that a selected message received by a client device is fraudulent, select a group of messages from a message corpus according to a similarity between members of the group of messages and the selected message;
in response to selecting the group of messages, identify a group of recipient devices comprising recipients of members of the selected group of messages;
determine whether a notification condition is satisfied according to a similarity between members of the identified group of recipient clients;

in response to determining that the notification condition is satisfied, identify a target device according to a similarity between a usage indicator of the target device and a usage indicator of a selected member of the group of recipient devices, the usage indicator of the target device quantifying a usage of a selected computer program by the target device; and transmit a security notification to the target device, the security notification formulated according to a content of multiple members of the group of messages and informing a user of the target device of a likelihood of receiving a fraudulent message similar to the selected message.

* * * * *